(12) United States Patent
Ishii (10) Patent No.: US 8,385,307 B2
(45) Date of Patent: Feb. 26, 2013

(54) TFC SELECTION APPARATUS IN MOBILE COMMUNICATION SYSTEM AND TFC SELECTION METHOD

(75) Inventor: Daiji Ishii, Tokyo (JP)

(73) Assignee: NEC Corporation, Tokyo (JP)

(*) Notice: Subject to any disclaimer, the term of this patent is extended or adjusted under 35 U.S.C. 154(b) by 919 days.

(21) Appl. No.: 12/519,694

(22) PCT Filed: Dec. 11, 2007

(86) PCT No.: PCT/JP2007/073852
§ 371 (c)(1), (2), (4) Date: Jun. 17, 2009

(87) PCT Pub. No.: WO2008/078550
PCT Pub. Date: Jul. 3, 2008

(65) Prior Publication Data
US 2010/0091754 A1 Apr. 15, 2010

(30) Foreign Application Priority Data
Dec. 22, 2006 (JP) .................................. 2006-345841

(51) Int. Cl.
*H04B 7/216* (2006.01)
(52) U.S. Cl. .................. 370/342; 370/229; 370/311
(58) Field of Classification Search ............ 370/342, 370/229, 230, 311, 318, 465
See application file for complete search history.

(56) References Cited

U.S. PATENT DOCUMENTS

| | | | | |
|---|---|---|---|---|
| 2003/0119452 A1* | 6/2003 | Kim et al. | | 455/69 |
| 2004/0259584 A1* | 12/2004 | Murata et al. | | 455/522 |
| 2005/0181731 A1* | 8/2005 | Asghar et al. | | 455/63.1 |
| 2006/0209883 A1* | 9/2006 | Suzuki | | 370/465 |
| 2006/0286997 A1* | 12/2006 | Seki et al. | | 455/525 |

FOREIGN PATENT DOCUMENTS

| | | |
|---|---|---|
| JP | 1998240108 A | 9/1998 |
| JP | 2003304195 A | 10/2003 |
| JP | 2005072900 A | 3/2005 |
| JP | 2005510120 A | 4/2005 |
| JP | 2005229393 A | 8/2005 |
| JP | 2005525718 A | 8/2005 |
| JP | 2006019868 A | 1/2006 |
| JP | 2006020234 A | 1/2006 |
| JP | 2006121753 A | 5/2006 |

OTHER PUBLICATIONS

International Search Report for PCT/JP2007/073852 mailed Mar. 11, 2008.

* cited by examiner

*Primary Examiner* — Kwang B Yao
*Assistant Examiner* — Nguyen Ngo (57) ABSTRACT

A TFC selection apparatus includes: a SIR calculation unit calculating SIR by using a CPICH symbol of receive data; a conversion unit obtaining STFC(m) which contains m pieces of TFC corresponding to the calculated SIR; a total transmit power calculation unit selecting TFC corresponding to the obtained STFC(m) from a TFCS which is a set of TFCs sequenced in proportion to a magnitude of total transmit power, and calculating total transmit power of TFC included in the TFCS in order indicated by a search direction signal, beginning with the selected TFC as a starting point; and a TFC selection unit generating the search direction signal based on the calculated total transmit power of the TFC as the starting point, and selecting an optimum TFC to be applied to transmit data from the TFCS, wherein the TFC selection unit selects TFC as the optimum TFC corresponding to total transmit power which indicates less than or equal to as well as approximate to a maximum value allowed for the transmit data.

9 Claims, 6 Drawing Sheets

FIG. 2

TABLE 1

| TFCS | LENGTH OF DATA SERIES-1 [bits] | LENGTH OF DATA SERIES-2 [bits] |
|---|---|---|
| TFC(1) | 0 | 0 |
| TFC(2) | 5 | 0 |
| TFC(3) | 8 | 0 |
| TFC(4) | 0 | 3 |
| TFC(5) | 5 | 3 |
| TFC(6) | 8 | 3 |
| TFC(7) | 0 | 7 |
| TFC(8) | 5 | 7 |
| TFC(9) | 8 | 7 |

TABLE 2

| STFC(m) | SIR VALUE A(m) |
|---|---|
|  |  |
|  |  |
| STFC(1) | A(1)=10 |
|  |  |
| STFC(2) | A(2)=20 |
|  |  |
|  |  |
|  |  |

TABLE 3 SEARCH DIRECTION = "0"

| TOTAL TRANSMIT POWER [dB] |
|---|
| 5 |
| 9 |
| 13 |
| 17 |
| 21 |
| 25 |
| 29 |
| 33 |
| 37 |

TABLE 4 SEARCH DIRECTION = "1"

| TOTAL TRANSMIT POWER [dB] |
|---|
| 1 |
| 4 |
| 7 |
| 10 |
| 13 |
| 16 |
| 19 |
| 22 |
| 25 |

| TABLE | | |
|---|---|---|
| TFCS | LENGTH OF DATA SERIES-1 [bits] | LENGTH OF DATA SERIES-2 [bits] |
| TFC(1) | ... | ... |
| TFC(2) | ... | ... |
| TFC(3) | ... | ... |
| TFC(4) | ... | ... |
| TFC(5) | ... | ... |
| TFC(6) | ... | ... |
| TFC(7) | ... | ... |
| TFC(8) | ... | ... |
| TFC(9) | ... | ... |

TFC SELECTION APPARATUS IN MOBILE COMMUNICATION SYSTEM AND TFC SELECTION METHOD

This application is the National Phase of PCT/JP2007/073852, filed Dec. 11, 2007, which is based upon and claims priority from Japanese Patent Application No. 2006-345841 filed Dec. 22, 2006.

TECHNICAL FIELD

The present invention relates to a TFC (transport format combination) selection device in a CDMA mobile communication system.

BACKGROUND ART

According to Wideband Code Division Multiplex Access (W-CDMA), which is a mobile telecommunications interface specified by 3GPP (3rd Generation Partnership Project) that is one of the International Standards Groups, upstream channels such as a DCH (Dedicated Channel) and an E-DCH (Enhanced DCH) are defined. A plurality of data series transmitted while being carried on one of these channels is present (data series 1, 2, . . . and N). Data pieces at appropriate data lengths are clipped from the data series, respectively and the clipped data pieces are combined, thereby forming transmit data. A combination of the lengths of the data pieces clipped from the respective data series is referred to as "TFC".

Figure 7:
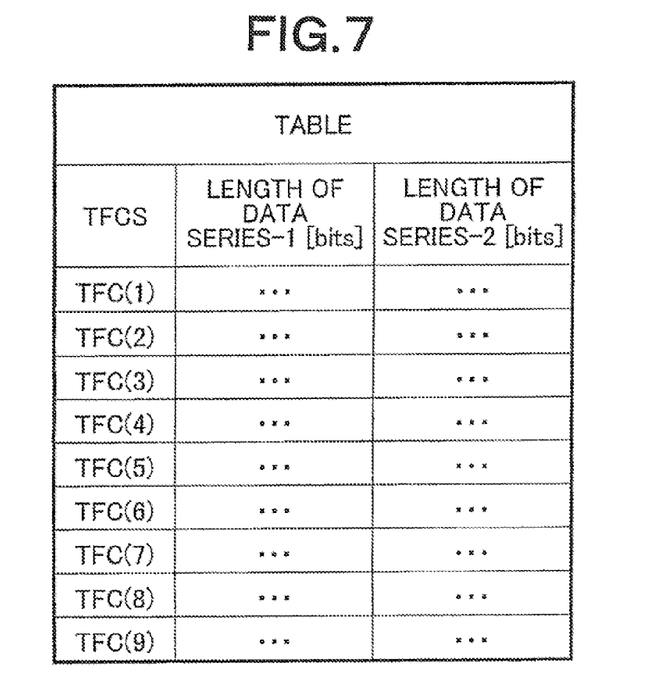
FIG. 7 is an explanatory diagram related to a TFCS in the ordinary mobile communication system.

Several tens to several hundreds of TFCs are present. A set of TFCs that are possibly present is referred to as TFCS (Transport Format Combination Set). FIG. 7 shows examples of the TFCS and TFC. "TABLE" shown in FIG. 7 is an example, of the TFC for which the number N of columns of data series is 2 (N=2) (data series-1 and -2) and the number of TFCs is 9 (TFC(1)-(9)).

Generally, higher total transmit power is required for mobile communication as transmit data is larger in size. Conversely, lower total transmit power is required for mobile communication as transmit data is smaller in size. Thus, the total transmission power differs among the TFCs.

Figure 5:
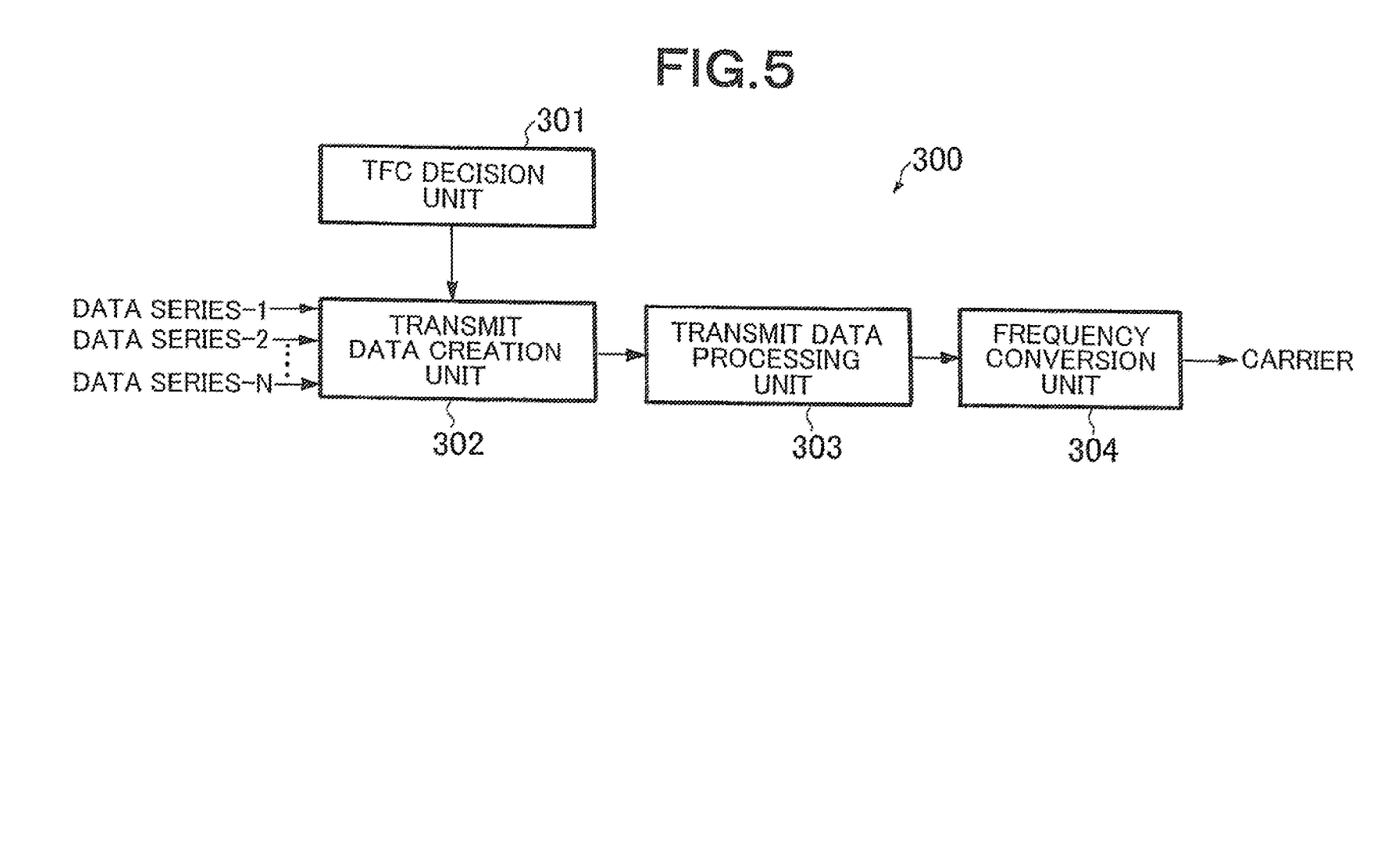
FIG. 5 is a configuration diagram of a transmission process unit in an ordinary mobile communication system.

Meanwhile, transmission process in the DCH or E-DCH is implemented according to a procedure 300 shown in FIG. 5. First, a TFC decision unit 301 decides a TFC which can be transmitted with a total transmit power that does not exceed a maximum value of allowable transmit power. A transmit data creation unit 302 clips data pieces from data series 1, 2, . . . and N, respectively, and combines the clipped data pieces based on each of the TFC decided by the TFC decision unit 301, thereby creating transmit data. A transmit data process unit 303 implements error correcting coding and interleaving on the created transmit data. Finally, a frequency conversion unit 304 modulates the transmit data processed by the transmit data process unit 303 and outputs the modulated transmit data as a carrier.

Figure 6:
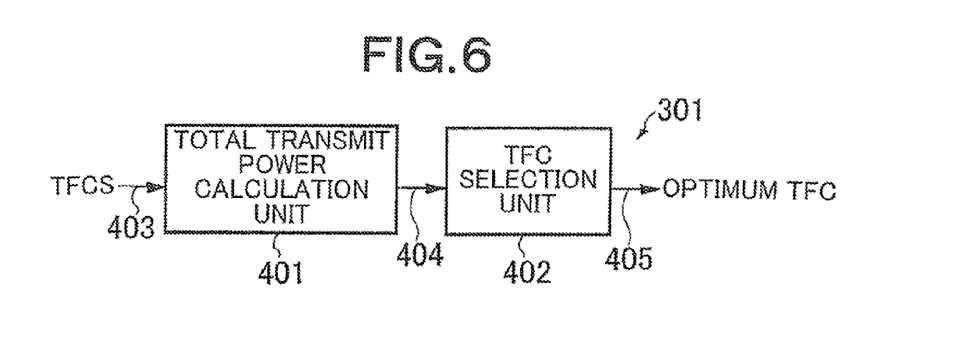
FIG. 6 is a configuration diagram of a TFC decision unit of the transmission process unit in the ordinary mobile communication system.

In a series of the foregoing units, the TFC decision unit 301 includes functions shown in FIG. 6. A total transmit power calculation unit 401 calculates total transmit powers of each TFC in a TFCS. A TFC selection unit 402 selects a TFC having a highest total transmit power from among the TFCs the total transmit powers of which do not exceed the maximum value of allowable transmit power.

As to selection of a TFC, there is known a technique as disclosed in, for example, Japanese Patent Application Laid-Open No. 2003-304195. This document discloses a TFC selection method for a mobile terminal device selecting a TFC that specifies a combination of transmit data lengths at predetermined time intervals in each transport channel, multiplexing transmit data on respective transport channels based on the selected TFC and transmitting the multiplexed transmit data.

CITATION LIST

Patent Literature

Japanese Patent Application Laid-Open No. 2003-304195

SUMMARY OF INVENTION

Technical Problem

A TFCS, however, generally contains several tens to several hundreds of TFCs. Due to this, if the process shown in FIG. 6 is implemented on all the TFCs in order to select an optimum TFC from among those TFCs, a huge amount of calculation is needed. To prevent this problem, there is proposed a method of realizing the procedure 300 by a circuit, for example, in which a plurality of TFC decision units 301 is parallelized in FIG. 5. In that case, process time is reduced, however, the circuit becomes larger in size. The larger-sized circuit is undesirable for a mobile communication device.

The present invention has been achieved to solve the conventional problems. It is an object of the present invention to provide a technique capable of reducing a calculation amount for selecting a transmit data TFC in a mobile communication.

Solution to Problem

A TFC selection apparatus according to one aspect of the present invention includes: a SIR calculation unit calculating SIR by using a CPICH symbol of receive data; a conversion unit obtaining STFC(m) which contains m pieces of TFC corresponding to the calculated SIR; a total transmit power calculation unit selecting TFC corresponding to the obtained STFC(m) from a TFCS which is a set of TFCs sequenced in proportion to a magnitude of total transmit power, and calculating total transmit power of TFC included in the TFCS in order indicated by a search direction signal, beginning with the selected TFC as a starting point; and a TFC selection unit generating the search direction signal based on the calculated total transmit power of the TFC as the starting point, and selecting an optimum TFC to be applied to transmit data from the TFCS, wherein the TFC selection unit selects TFC as the optimum TFC corresponding to total transmit power which indicates less than or equal to as well as approximate to a maximum value allowed for the transmit data.

A TFC selection method according to another aspect of the present invention includes: calculating SIR by using a CPICH symbol of receive data; obtaining STFC(m) which contains m pieces of TFC corresponding to the calculated SIR; selecting TFC corresponding to the obtained STFC(m) from a TFCS which is a set of TFCs sequenced in proportion to a magnitude of total transmit power; generating a search direction signal based on the calculated total transmit power of the selected TFC; calculating the total transmit power of TFC included in the TFCS in order indicated by the search direction signal, beginning with the selected TFC as a starting point; and selecting TFC as an optimum TFC, to be applied to transmit data from the TFCS, corresponding to total transmit power which indicates less than or equal to as well as approximate to a maximum value allowed for the transmit data.

A program according to yet another aspect of the present invention causes a computer to function as the TFC selection apparatus according to one aspect of the present invention.

Advantageous Effects of Invention

According to the present invention, a calculation amount necessary to select an optimum TFC to be applied to transmit data can be reduced. It is thereby possible to prevent a circuit of the device from becoming large in scale. Further, if the present invention is realized as the program, process time can be reduced.

REFERENCE SIGNS LIST

100 TFC selection apparatus
101 Total transmit power calculation unit
102 TFC selection unit
103 TFCS
104 total transmit power
105 Optimum TFC
106 Search direction signal
107 SIR calculation unit
108 Conversion unit
109 CPICH symbol
110 SIR
111 STFC

DESCRIPTION OF THE EMBODIMENTS

Embodiments of the present invention will be described hereinafter with reference to the drawings.

In mobile communication, as a situation of a radio wave propagation path is better, data large in size can be transmitted with lower transmit power. On the other hand, as the situation of the radio wave propagation path is worse, it is necessary to transmit data small in size with a higher transmit power. One of indexes representing the situation of the radio wave propagation path is SIR (Signal to Interference Ratio). Therefore, the SIR is correlative to a TFC. The SIR is calculated from a CPICH (Common Pilot Channel) symbol in a procedure of W-CDMA reception process.

Figure 2:
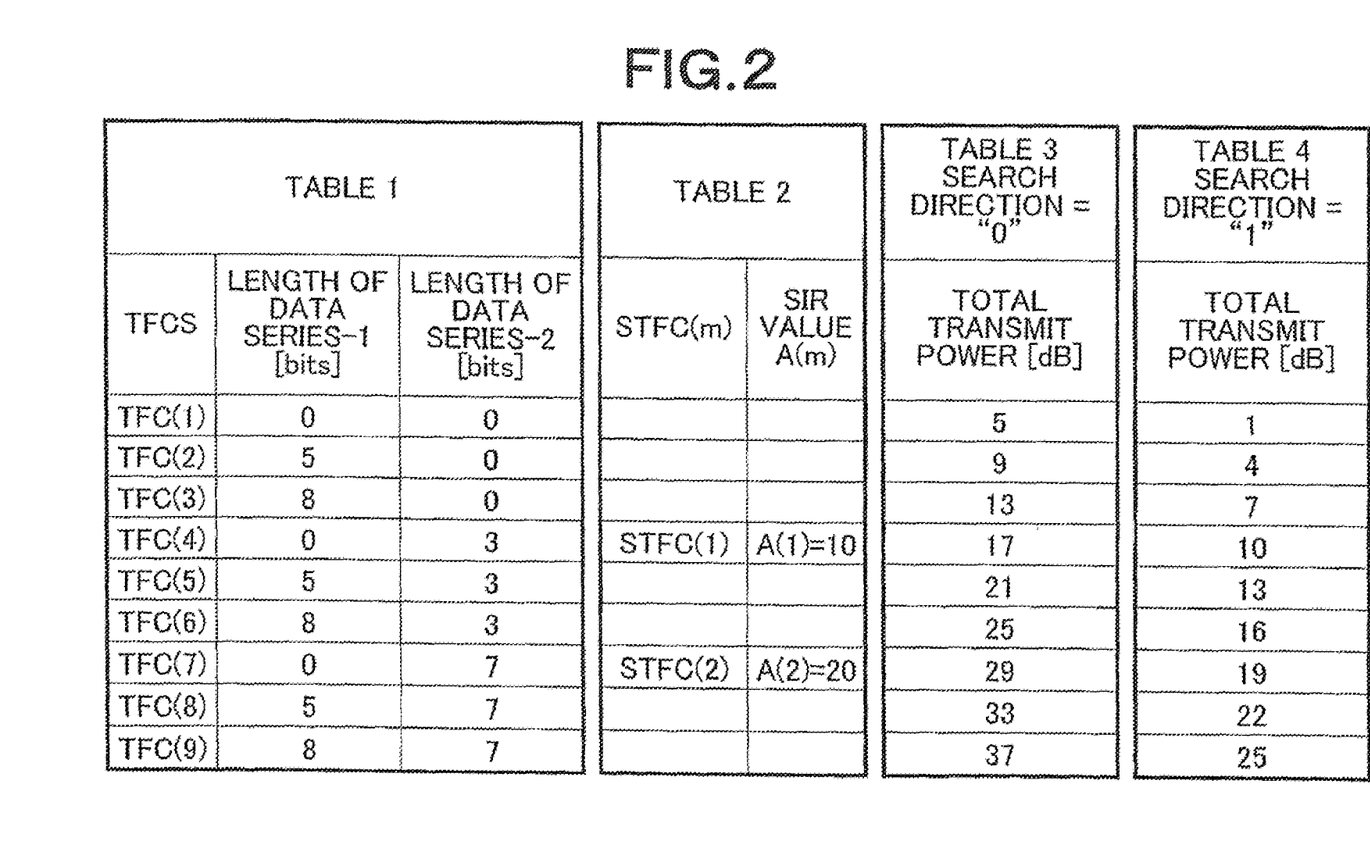
FIG. 2 is an explanatory diagram related to a TFCS according to the embodiment.

In FIG. 2, TABLE 1 is an example of a table in which a TFCS is set. In this embodiment, by using the correlation between the SIR and the TFC, an optimum TFC applied to transmit data is efficiently searched from among TFCs shown in the TABLE 1.

If the TFCS contains J pieces of TFC, the TFCs are denoted as TFC(1), TFC(2), . . . , TFC(j), . . . and TFC(J), respectively (j=1, 2, . . . , J). The series of TFC(j) are higher in total transmit power as a value of j is larger, that is, in ascending order (TABLEs 3 and 4). In this way, the series of TFCs of the TFCS (TABLE 1) is assigned order (j) in proportion with a magnitude of the total transmit power.

TFCs selected from the TFCS is STFC (Selected TFC). When M pieces of TFC are selected from the TFCS, the STFCs are denoted as STFC(1), STFC(2), . . . , STFC(m), . . . and STFC(M) (m=1, 2, . . . , M), respectively.

To search an optimum TFC from the TFCS, the STFC(m) satisfying a condition of the following inequality (1) is decided.

$$A(m) \leq SIR < A(m+1) \quad (1)$$

In the inequality (1), A(m) denotes SIR value corresponding to an arbitrary STFC(m). An appropriate value is set as the A(m) to correspond to the STFC(m). TABLE 2 of FIG. 2 shows an example of combinations of STFC(m) and A(m). In the TABLE 2, if A(m) is, for example, A(1), A(m+1) is A(2). Each line of the TABLE 2 corresponds to the TFC(j) in each line of the TABLE 1.

The STFC(m) decided based on the inequality (1) corresponds to a starting point for search of the optimum TFC. In other words, if the optimum TFC is to be searched from the TABLE 1 of FIG. 2, the TFC(j) in the TABLE 1 corresponding to the STFC(m) in the TABLE 2 serves as the starting point of search.

Next, a total transmit power of the TFC as the starting point is calculated. A search direction of the optimum TFC is decided according to whether the calculated total transmit power exceeds a maximum value of allowable transmit power (case "A") or not (case "B"). The search direction refers to transition of j when the TFC(j) as the optimum TFC is searched from the TABLE 1. Specifically, the search direction is a direction in which the value of j is greater (a direction in ascending order) or a direction in which the value of j is smaller (a direction in descending direction).

(A) The case of the total transmit power of the starting point exceeding the maximum value of allowable transmit power:

In this case, the TFC(j) is searched in the descending order, beginning with the starting point. This search direction means a direction in which the total transmit power falls. First, after recognizing the TFC(j) corresponding to the decided STFC(m) as the starting point, a total transmit power of a TFC(j−1) which is smaller in j than that of the starting point is calculated. If the total transmit power of the TFC(j−1) exceeds the maximum value of allowable transmit power, then a total transmit power of a TFC(j−2) is calculated. If the total transmit power of the TFC(j−2) exceeds the maximum allowable transmit power, then a total transmit power of a TFC(j−3) is calculated. The equivalent process is implemented hereafter. If a total transmit power of as TFC(j−K) indicates less than or equal to the maximum value of allowable transmit power for the first time, this TFC(j−K) is selected as the optimum TFC.

(B) The case of the total transmit power of the starting point being less than or equal to the maximum value of allowable transmit power:

In this case, the TFC(j) is searched in the ascending order, beginning with the starting point. This search direction means to a direction in which the total transmit power rises. First, after recognizing the TFC(j) corresponding to the STFC(m) decided based on the inequality (1) as the starting point, a total transmit power of a TFC(j+1) which is bigger in j than that of the starting point is calculated. If the total transmit power of the TFC(j+1) is less than or equal to the maximum value of allowable transmit power, then a total transmit power of a TFC(j+2) is calculated. If the total transmit power of the TFC(j+2) is less than or equal to the maximum value of allowable transmit power, then a total transmit power of a TFC(j+3) is calculated. The equivalent process is implemented hereafter. If a total transmit power of a TFC(j+L) exceeds the maximum allowable value of transmit power for the first time, a TFC(j+L−1) just prior to the TFC(j+L) is selected as the optimum TFC.

By the above-mentioned control, a TFC corresponding to a total transmit power which is less than or equal to as well as approximate to the maximum value of allowable transmit power is selected as the optimum TFC whichever the case (A) or (B) arises.

EXAMPLE

Figure 1:
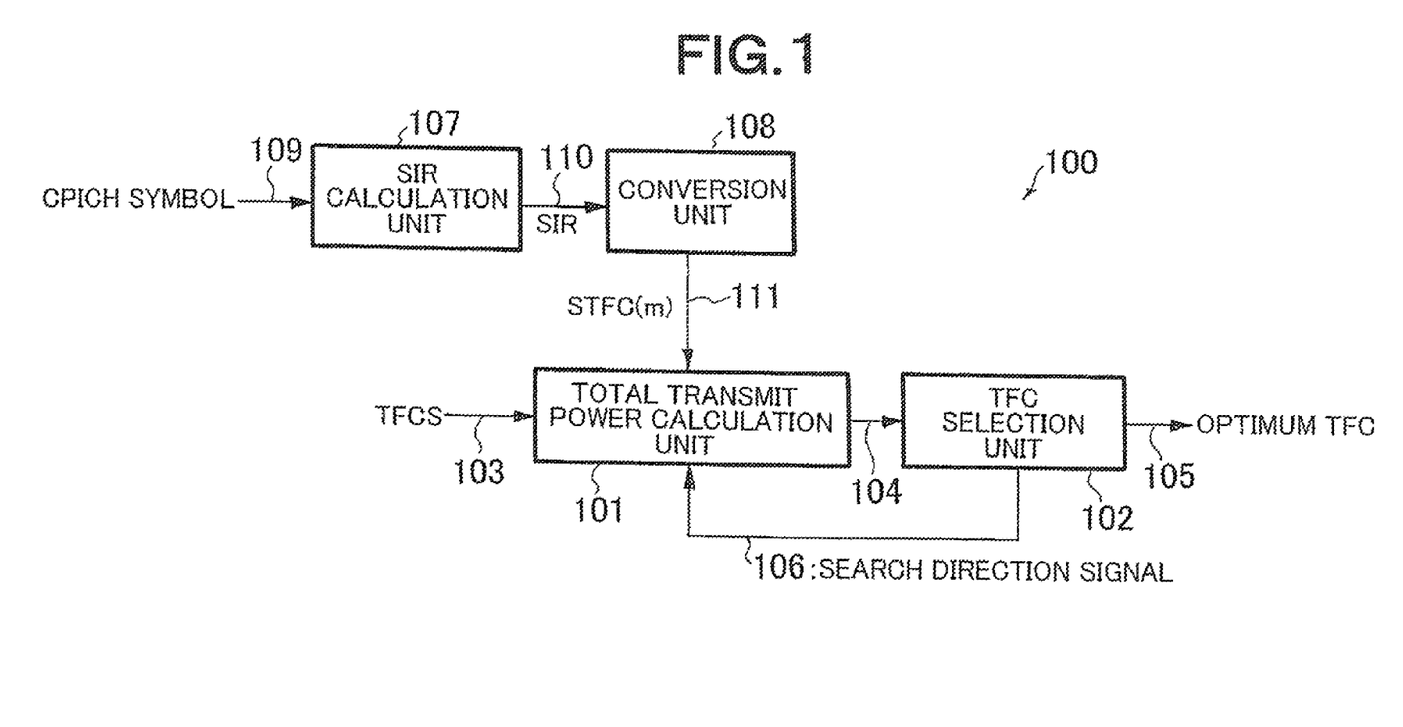
FIG. 1 is a configuration diagram of a TFC selection apparatus according to an embodiment of the present invention.

A configuration of a TFC selection apparatus according to an embodiment of the present invention will be described with reference to FIG. 1. A TFC selection apparatus 100 according to the embodiment is configured to include the following constituent elements. These constituent elements can be either realized by program control or constituted by hardware such as an ASIC (Application Specific Integrated Circuit).

A total transmit power calculation unit 101 is a block which calculates a total transmit power 104. The TFCS 103, the STFC(m) 111 corresponding to the starting point for searching the optimum TFC, and a search direction signal 106 indicating the direction of the search of the optimum TFC are input to the total transmit power calculation unit 101. The total transmit power calculation unit 101 outputs the total transmit power 104 of TFC currently searched.

A TFC selection unit 102 is a block which decides an optimum TFC 105 by comparing the total transmit power 104 with a specified maximum allowable transmit power. Further, the TFC selection unit 102 generates the search direction signal 106 according to the value of the total transmit power 104 of the TFC serving as the starting point of the search. The TFC selection unit 102 supplies the generated search direction signal 106 to the total transmit power calculation unit 101. The search direction signal 106 indicates "1", if the TFC(j) should be searched in the ascending order. The search direction signal 106 indicates "0", if the TFC(j) should be searched in the descending order.

A SIR calculation unit 107 is a block which calculates SIR 110 by using a CPICH symbol 109 obtained from receive data.

A conversion unit 108 is a block which makes the SIR 110 correspond to STFC(m) 111 based on the inequality (1). The conversion unit 108 is input the SIR 110 and outputs the STFC(m) 111.

Operation implemented by the TFC selection apparatus according to this embodiment will be described with reference to FIG. 1 and flowcharts of FIGS. 3 and 4.

Figure 3:
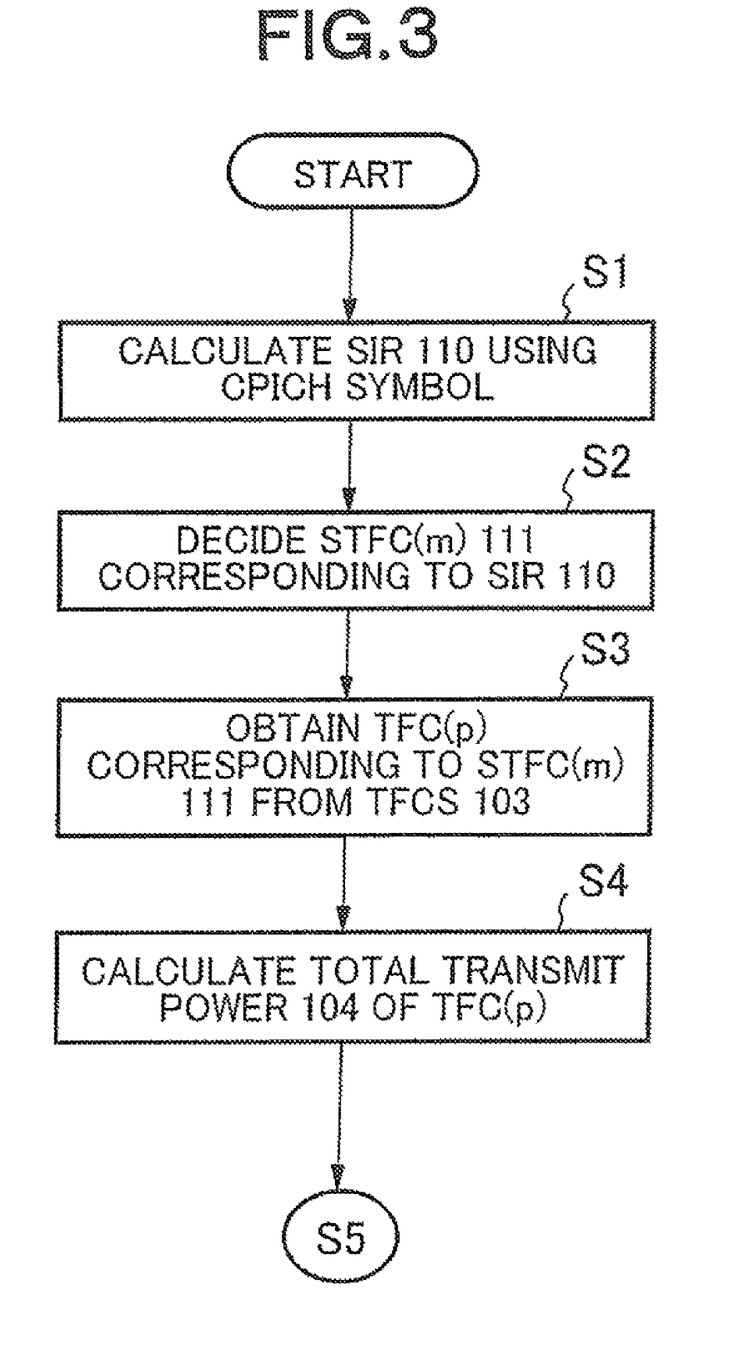
FIG. 3 is a flowchart related to operation implemented by the TFC selection apparatus according to the embodiment.

The SIR calculation unit 107 calculates the SIR 110 by using the CPICH symbol 109 (FIG. 3: step S1).

The conversion unit 108 decides STFC(m) 111 corresponding to the SIR 110 based on the inequality (1) (step S2).

The total transmit power calculation unit 101 obtains TFC (p) as a starting point of a search, which corresponds to the STFC(m) 111 from TFCS 103 (step S3).

The total transmit power calculation unit 101 calculates total transmit power 104 of the TFC(p) serving as the starting point (step S4).

Figure 4:
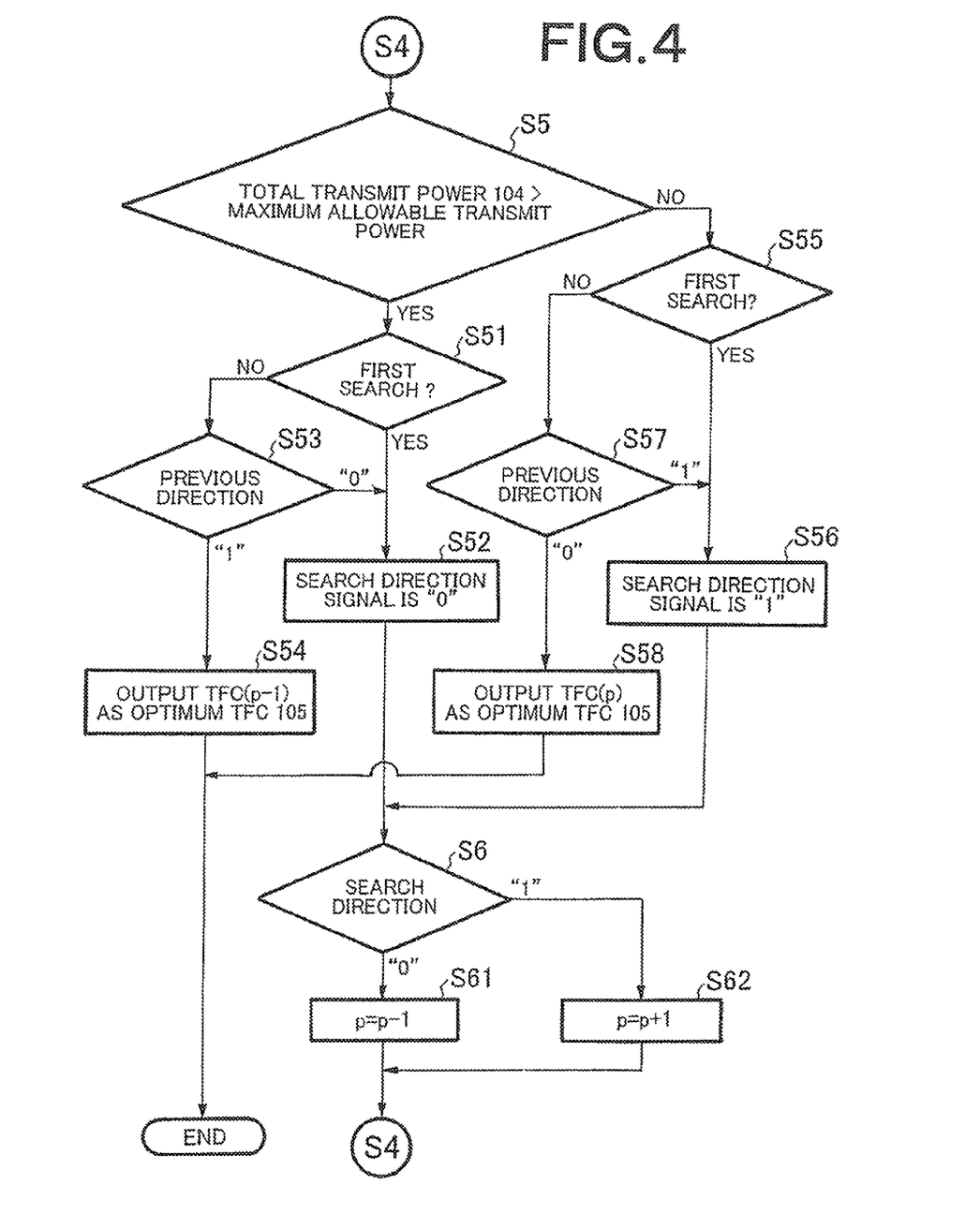
FIG. 4 is a flowchart related to operation implemented by the TFC selection apparatus according to the embodiment.

The TFC selection unit 102 determines whether the total transmit power 104 of the TFC(p) as the starting point exceeds the maximum value of allowable transmit power (FIG. 4: step S5).

If the total transmit power 104 of the starting point exceeds the maximum value of allowable transmit power (step S5: Yes, step S51: Yes), the TFC selection unit 102 outputs the search direction signal 106 indicating "0" corresponding to a search direction of descending order. If the search is not for the first time and the previous search direction signal 106 indicates "0" (step S53: "0"), the TFC selection unit 102 outputs the search direction signal 106 indicating "0". On the other hand, if the previous search direction signal 106 indicates "1" (step S53: "1"), the TFC selection unit 102 outputs a TFC(p−1) as the optimum TFC 105 (step S54).

By the algorithm mentioned above, when the total transmit power 104 of the starting point exceeds the maximum allowable transmit power, a timing at which the total transmit power 104 of TFC currently searched is less than the maximum value of allowable transmit power for the first time can be detected. The TFC detected at this timing can be obtained as the optimum TFC 105.

If the total transmit power 104 of the starting point is less than or equal to the maximum value of allowable transmit power (step S5: No, step S55: Yes), the TFC selection unit 102 outputs the search direction signal 106 indicating "1" corresponding to search direction in the ascending order. Further, if the search is not for the first time and the previous search direction signal 106 indicates "1" (step S57: "1"), the TFC selection unit 102 outputs the search direction signal 106 indicating "1". On the other hand, if the previous search direction signal 106 indicates "0" (step S57: "0"), the TFC selection unit 102 outputs TFC(p) as the optimum TFC 105 (step S58).

By the algorithm mentioned above, when the total transmit power 104 of the starting point is less than or equal to the maximum allowable transmit power, a timing at which the total transmit power 104 of the TFC currently searched is less than or equal to as well as approximate to the maximum allowable transmit power can be detected. The TFC detected at this timing can be obtained as the optimum TFC 105.

If the search direction signal 106 from the TFC selection unit 102 indicates "0" (step S6: "0"), the total transmit power calculation unit 101 calculates the total transmit power 104 of the TFC(p) according to the descending order of "p=p−1" (step S61, FIG. 3: step S4). If the search direction signal 106 indicates "1" (step S6: "1"), the total transmit power calculation unit 101 calculates the total transmit power 104 of the TFC(p) according to the ascending order of "p=p+1" (step S62, FIG. 3: step S4).

Referring to FIGS. 1 to 4, a specific example of the operation will now be described. In this example, it is assumed that the maximum allowable transmit power is "23" and that the number N of TFCs is "9". It is also assumed herein that the total transmit power 104 is calculated as shown in the TABLE 3 of FIG. 2, if the search direction signal 106 indicates "0" (case A), and that the total transmit power 104 is calculated as shown in the TABLE 4 of FIG. 2 if the search direction signal 106 indicates "1" (case B).

(A) The search direction signal 106 indicates "0":

Now the SIR 110 calculated at the step S1 (FIG. 3) is assumed as "21".

At the step S2, "A(2)<SIR 110" is clear from the TABLE 2 of FIG. 2. Accordingly, the STFC(2) is obtained as the STFC (m) 111 corresponding to a starting point for the coming search.

At the step S3, it is clear from the TABLEs 1 and 2 that the STFC(2) corresponds to TFC(7). Accordingly, it is recognized that "p=j=7", and that the TFC(p) as the starting point of the search is the TFC(7).

According to the example shown in TABLE 3, the total transmit power 104 of the TFC(7) calculated at the step S4 is "29".

At the step S5, it is determined that the total transmit power 104 "29" of the TFC(7) exceeds maximum value of allowable transmit power "23". Then, the search direction signal 106 indicating "0" is output at the step S52.

If it is determined at the step S6 that the search direction indicates "0", the total transmit power calculation unit 101 calculates the total transmit power 104 of TFC(6) at the step S4 based on "p=p−1=6" obtained at the step S61. That is, the TFC(6) is examined next to the TFC(7) as the starting point.

According to the example shown TABLE 3 of FIG. 2, the total transmit power 104 of TFC(6) calculated at the step S4 is "25".

At the step S5, it is determined that the total transmit power 104 "25" of TFC(6) exceeds the maximum value of allowable transmit power "23". Since the previous search direction signal 106 applied to the TFC(7) indicates "0", the search direction signal 106 indicating "0" is output for the current TFC(6) through the determination at the step S53.

If it is determined at the step S6 that the search direction signal 106 indicates "0", the total transmit power 104 of TFC(5) is calculated at the step S4 based on "p=p−1=5" obtained at the step S61. That is, the TFC(5) is examined next to the TFC(6).

According to the example shown in TABLE 3 of FIG. 2, the total transmit power 104 of TFC(5) calculated at the step S4 is "21".

At the step S5, it is determined that the total transmit power 104 "21" of the TFC(5) is less than the maximum value of allowable transmit power "23". Here, the previous search direction signal 106 applied to the TFC(6) indicates "0". Therefore, the TFC(p), that is, TFC(5) as currently examined TFC is output as the optimum TFC 105 at the step S58 through the step S57. In this way, the TFC which is less than the maximum value of allowable transmit power for the first time is detected as the optimum TFC 105.

(B) The search direction signal 106 indicates "1":

In this case, the total transmit power 104 is calculated as shown in TABLE 4 of FIG. 2 as mentioned above. It is assumed that the SIR 110 calculated at the step S1 is "21".

At the step S2, "A(2)<SIR 110" is clear from the TABLE 2. Accordingly, the STFC(2) is obtained as STFC(m) 111 corresponding to a starting point for the coming search.

At the step S3, it is clear from the TABLEs 1 and 2 that the STFC(2) corresponds to the TFC(7). Accordingly, it is recognized that "p=j=7", and that the TFC(p) as the starting point of the search is the TFC(7).

According to the example shown in TABLE 4, the total transmit power 104 of the TFC(7) calculated at the step S4 is "19".

At the step S5, it is determined that the total transmit power 104 "19" of the TFC(7) is less than the maximum value of allowable transmit power "23". Then, the search direction signal 106 indicating "1" is output at the step S55.

If it is determined at the step S6 that the search direction indicates "1", the total transmit power calculation unit 101 calculates the total transmit power 104 of TFC(8) at the step S4 based on "p=p+1=8" obtained at the step S62. That is, the TFC(8) is examined next to the TFC(7) as the starting point.

According to the example shown TABLE 4 of FIG. 2, the total transmit power 104 of the TFC(8) calculated at the step S4 is "22".

At the step S5, it is determined that the total transmit power 104 "22" of the TFC(8) is less than the maximum value of allowable transmit power "23". Since the previous search direction signal 106 applied to the TFC(7) indicates "1", the search direction signal 106 indicating "1" is output for the current TFC(8) through the determination at the step S57.

If it is determined at the step S6 that the search direction signal 106 indicates "1", the total transmit power 104 of TFC(9) is calculated at the step S4 based on "p=p+1=9" obtained at the step S62. That is, the TFC(9) is examined next to the TFC(8).

According to the example shown in TABLE 4 of FIG. 2, the total transmit power 104 of the TFC(9) calculated in the step S4 is "25".

At the step S5, it is determined that the total transmit power 104 "25" of the TFC(9) exceeds the maximum value of allowable transmit power "23". Here, the previous search direction signal 106 applied to the TFC(8) indicates "1". Therefore, the TFC(p−1), that is, TFC(8) as previously examined TFC is output as the optimum TFC 105 at the step S54 through the step S53. In this way, the TFC which is less than or equal to as well as approximate to the maximum allowable transmit power is detected as the optimum TFC 105.

According to the ordinary method described with reference to FIGS. 5 to 7, it is necessary to calculate total transmit power of each of all the nine TFCs constituting the TFCS. In contrast, in the above-mentioned example, the total transmit power is calculated for each of three out of the nine TFCs. The reason why the number of calculation targets can be reduced is that, the starting point indicating an aim in the search of the optimum TFC is previously set instead of arbitrarily searching the optimum TFC from the TFCS.

According to this embodiment, therefore, the amount of calculations for total transmit power and selecting the TFC is reduced. As a result, the optimum TFC can be searched efficiently from TFCS even if the TFCS comprises a large-scale set of several tens to several hundreds of TFCs. Moreover, it is possible to prevent the circuit from becoming large in scale since there is no need to provide parallel circuits for efficiency of the search.

In the above-mentioned embodiment, the search direction signal for the search on TFCS (TABLE 1) indicates one direction such as the direction in the ascending order or that in the descending order from the starting point. However, the number of search directions according to the present invention is not limited to one. For example, a predetermined number of TFCs may be examined in each of two directions (directions in the ascending and descending orders, respectively) from the starting point. And then, the optimum TFC may be selected based on results of the examinations. It is thereby possible to examine TFCs near the starting point.

INDUSTRIAL APPLICABILITY

The present invention is applicable to a mobile terminal or a base station in a CDMA mobile communication system. The present invention may be carried out as a computer program corresponding to the operation according to the above-stated embodiment or as a recording medium storing therein the program. In the latter case, computer process time can be reduced.

The invention claimed is:

1. A transport format combination (TFC) selection apparatus comprising:
   a signal to interference ratio (SIR) calculation unit calculating SIR by using a common pilot channel (CPICH) symbol of receive data;
   a conversion unit obtaining STFC(m) which contains M pieces of TFC corresponding to the calculated SIR; where STFC(m) is one of selected transport format combinations (STFCs) denoted as STFC(1), STFC(2), ..., STFC(m), ... and STFC(M) (m=1, 2, ..., M);

a total transmit power calculation unit selecting TFC corresponding to the obtained STFC(m) from a transport format combination set (TFCS) which is a set of transport format combinations (TFCs) sequenced in proportion to a magnitude of total transmit power, and calculating total transmit power of TFC included in the TFCS in order indicated by a search direction signal, beginning with the selected TFC as a starting point; and a TFC selection unit generating the search direction signal based on the calculated total transmit power of the TFC as the starting point, and selecting TFC as an optimum TFC, to be applied to transmit data from the TFCS, corresponding to total transmit power which indicates less than or equal to as well as approximate to a maximum value allowed for the transmit data.

2. The TFC selection apparatus according to claim 1, wherein the TFC selection unit generates the search direction signal indicating an order in which the total transmit power falls if the calculated total transmit power of the TFC as the starting point exceeds the maximum value, and generating the search direction signal indicating an order in which the total transmit power rises if the total transmit power of the TFC as the starting point is less than or equal to the maximum value.

3. The TFC selection apparatus according to claim 1,
wherein the conversion unit detects A(m), where A(m) denotes an SIR value corresponding to the STFC(m), where the SIR calculated by the SIR calculation unit indicates more than or equal to the A(m) preset for STFC(m) as well as less than A(m+1) preset for STFC (m+1), and obtains the STFC(m) corresponding to the detected A(m) as the STFC(m) corresponding to the calculated SIR.

4. A computer-implemented method for transport format combination (TFC) selection, comprising:

calculating signal to interference ratio (SIR), in a first computer process, by using a common pilot channel (CPICH) symbol of receive data;

obtaining in a second computer process, STFC(m) which contains M pieces of TFC corresponding to the calculated SIR, where STFC(m) is one of selected transport format combinations (STFCs) denoted as STFC(1), STFC(2), ..., STFC(m), ... and STFC(M) (m=1, 2, ..., M);

selecting, in a third computer process, TFC corresponding to the obtained STFC(m) from a transport format combination set (TFCS) which is a set of transport format combination (TFCs) sequenced in proportion to a magnitude of total transmit power;

generating, in a fourth computer process, a search direction signal based on the calculated total transmit power of the selected TFC;

calculating, in a fifth computer process, the total transmit power of TFC included in the TFCS in order indicated by the search direction signal, beginning with the selected TFC as a starting point; and selecting, in a sixth computer process, TFC as an optimum TFC, to be applied to transmit data from the TFCS, corresponding to total transmit power which indicates less than or equal to as well as approximate to a maximum value allowed for the transmit data.

5. The method according to claim 4,
wherein when generating the search direction signal, the generated search direction signal indicates an order in which the total transmit power falls if the calculated total transmit power of the TFC as the starting point exceeds the maximum value, and indicates an order in which the total transmit power rises if the calculated total transmit power of the TFC as the starting point is less than or equal to the maximum value.

6. The method according to claim 4,
wherein when obtaining the STFC(m) corresponding to the calculated SIR, A(m) where the calculated SIR indicates more than or equal to the A(m) preset for STFC(m) as well as less than A(m+1) preset for STFC(m+1) is detected, where A(m) denotes an SIR value corresponding to the STFC(m), and the STFC(m) corresponding to the detected A(m) is obtained as the STFC(m) corresponding to the calculated SIR.

7. A non-transitory computer-readable medium embedded with a computer executable program including instructions for:

calculating signal to interference ration (SIR) by using a common pilot channel (CPICH) symbol of receive data;

obtaining STFC(m) which contains M pieces of transport format combination (TFC) corresponding to the calculated SIR, where STFC(m) is one of selected transport format combinations (STFCs) denoted as STFC(1), STFC(2), ..., STFC(m), ... and STFC(M) (m=1, 2, ..., M);

selecting TFC corresponding to the obtained STFC(m) from a transport format combination set (TFCS) which is a set of transport format combinations (TFCs) sequenced in proportion to a magnitude of total transmit power;

generating a search direction signal based on the calculated total transmit power of the selected TFC;

calculating the total transmit power of TFC included in the TFCS in order indicated by the search direction signal, beginning with the selected TFC as a starting point; and selecting TFC as an optimum TFC, to be applied to transmit data from the TFCS, corresponding to total transmit power which indicates less than or equal to as well as approximate to a maximum value allowed for the transmit data.

8. The non-transitory computer-readable medium according to claim 7,
wherein when generating the search direction signal, the generated search direction signal indicates an order in which the total transmit power falls if the calculated total transmit power of the TFC as the starting point exceeds the maximum value, and indicates an order in which the total transmit power rises if the calculated total transmit power of the TFC as the starting point is less than or equal to the maximum value.

9. The non-transitory computer-readable medium according to claim 7,
wherein when obtaining the STFC(M) corresponding to the calculated SIR, A(m) where the calculated SIR indicates more than or equal to the A(m) preset for STFC(m) as well as less than A(m+1) preset for STFC(m+1) is detected, where A(m) denotes an SIR value corresponding to the STFC(m), and the STFC(m) corresponding to the detected A(m) is obtained as the STFC(m) corresponding to the calculated SIR.

* * * * *